United States Patent
Nemedi et al.

(10) Patent No.: US 6,572,779 B2
(45) Date of Patent: Jun. 3, 2003

(54) METHOD FOR TRANSPORTING AND SEPARATING WET CHIPS AND DELIVERING DRIED CHIPS

(75) Inventors: William D. Nemedi, Paw Paw, MI (US); Robert J. Nemedi, Kalamazoo, MI (US)

(73) Assignee: Inter-Source Recovery Systems, Kalamazoo, MI (US)

( * ) Notice: Subject to any disclaimer, the term of this patent is extended or adjusted under 35 U.S.C. 154(b) by 0 days.

(21) Appl. No.: 10/068,732

(22) Filed: Feb. 5, 2002

(65) Prior Publication Data

US 2002/0158030 A1 Oct. 31, 2002

Related U.S. Application Data

(62) Division of application No. 09/504,764, filed on Feb. 15, 2000, now Pat. No. 6,375,841.

(51) Int. Cl.$^7$ ............... B04B 1/04; B07B 4/02
(52) U.S. Cl. ............ 210/787; 210/806; 210/808; 494/37; 468/168; 468/174; 468/191; 209/12.1; 209/134; 209/138

(58) Field of Search ............... 210/787, 806, 210/808, 360.1, 373, 375, 380.1, 416.1; 494/36, 37, 43; 406/168, 174, 191; 209/12.1, 133, 134, 138

(56) References Cited

U.S. PATENT DOCUMENTS

| | | | |
|---|---|---|---|
| 4,310,417 A | 1/1982 | Dudley et al. | 210/410 |
| 4,936,822 A | 6/1990 | Nemedi | 494/43 |
| 5,106,487 A | 4/1992 | Nemedi | 209/44.2 |
| 5,264,124 A | 11/1993 | Nemedi | 210/380.1 |
| 5,464,310 A | 11/1995 | Federhen | 406/164 |

Primary Examiner—David A. Reifsnyder
(74) Attorney, Agent, or Firm—Marshall, Gerstein & Borun

(57) ABSTRACT

A system for transporting wet chips to a centrifugal separator where the wet chips are separated into dry chips and fluid with the dry chips being transported to a dry chips site and the fluid recirculated or collected. Preferably, the centrifugal separator, when actuated, serves to generate a pneumatic flow of air through a wet chip conduit whereby the wet chips are pneumatically conveyed to the separator from a source of origin such as a tooling machine station where wet chips are generated. A parts separator may be located at either end of the wet chip conduit.

32 Claims, 4 Drawing Sheets

METHOD FOR TRANSPORTING AND SEPARATING WET CHIPS AND DELIVERING DRIED CHIPS

This is a Divisional of U.S. application Ser. No. 09/504,764, filed Feb. 15, 2000 now U.S. Pat. No. 6,375,841.

BACKGROUND OF THE INVENTION

The present invention is directed to the use of a centrifugal parts separator or wringer for transporting wet chips or materials to the wringer for separation into dry solids and fluids as well as delivering the dried solids to one or more recovery sites. More particularly, the invention is directed to the pneumatic delivery of wet materials to a centrifugal separator where they are separated in addition to pneumatically delivering the dried solids to a recovery site.

In machining operations involving machines such as a lathe, milling machine, or router, a piece of metal or plastic stock is worked and a substantial scrap byproduct is generated. The scrap material generally comprises elongated helical or other shaped pieces saturated with lubricant or coolant fluid. Often, the scrap material constitutes cast iron, aluminum, steel, or brass chips with lubricating or coolant fluid adhering to the chips.

In conventional chip processing systems, the scrap material generally is mechanically conveyed or otherwise transported to a centrifugal separator where the wet chips are centrifuged whereby fluid is substantially separated from the chips. Recovered fluid often is recirculated in the system while the dried chips are collected at a recovery site for further disposition. An example of a centrifugal separator or wringer presently employed is exemplified and illustrated in Nemedi U.S. Pat. No. 5,264,124, the entire disclosure and drawings of which are incorporated herein by reference.

In many chip separation systems, the tooling machine or station where wet chips are generated is located a substantial distance from the centrifugal separator. Following one or more machining operations, the scrap material, e.g., wet metal chips, is delivered to one or more centrifugal separators by means of mechanical or auger type conveyors which are positioned between the source of origin of the wet chips, i.e., tooling machine, wet chip storage bin, or jitney delivering wet chips, and a centrifugal separator. It can be appreciated that such mechanical conveyors are relatively costly items often requiring a substantial amount of space. Moreover, mechanical conveyors presently utilized have to be repaired or otherwise maintained on a regular basis which can be time consuming and relatively costly. Further, a separate source of energy, e.g., motor is required to actuate one or more mechanical conveyors. It is desired to reduce the need for extended maintenance and the separate energy requirements presently associated with wet chip delivery systems.

Moreover, with some conventional chip processing systems, the wet materials are fed directly to a mechanical conveyor system. Nevertheless, it is not uncommon to have wet chips to be separated inadvertently fail to fall onto a particular mechanical conveyor in the delivery process. Rather, the wet chips fall onto and accumulate on the floor in the area contiguous to a tooling machine often requiring an individual to sweep up the wet chips and manually place them onto a mechanical conveyor. It is desired to have a delivery system that would obviate the need for this supplemental manual delivery of wet chips.

Additionally, a parts separator device often is utilized with centrifugal separators. The parts separator serves to separate out heavy, undesired materials such as nuts, bolts, tools, or the like which are mixed with the wet chip materials prior to the wet chips entering the centrifugal separator. Should these heavy items enter the centrifugal separator, they sometimes can damage the centrifuge. Examples of parts separators are illustrated in Nemedi U.S. Pat. No. 5,106,487, the entire disclosure and drawings of which are incorporated herein by reference. Parts separators often, but not always, are connected directly to the centrifugal separator. Wet chips to be dried pass through a parts separator conduit having one of two ends attached to the centrifuge. Wet chips pass through the opposite conduit end and heavy, unwanted parts drop by gravity through a conduit opening prior to the wet chips entering the centrifuge. What is desired is to have the ability to locate a parts separator contiguous to a machine station whereby heavy objects can be removed from a wet chip transport conveyor system prior to being placed on the mechanical conveyor.

What also is desired is to minimize space presently required for transporting wet chip materials to one or more centrifugal separators. Specifically, it is desired to eliminate the need for mechanical conveyor(s) including the source of energy (e.g., separate motor(s) required to actuate such conveyor(s). Moreover, it is desired to have a wet chip delivery system which can be utilized in those instances where space is at a premium and a substantial distance exists between the location of the centrifugal separator(s) and the source of origin of the wet chips, e.g., tooling machine, scrap bin, etc. It also is desired to have a wet chip delivery system where wet chips which, for whatever reason, fall to the floor at a machine site, can be collected without requiring a maintenance worker or operator to manually sweep up the scrap material and place it on a mechanical conveyor.

Further, it is desired to utilize a wet chip delivery system which will permit a parts separator to be located proximate to the source of wet chip origin. Having a parts separator located at this location whereby heavy, unwanted objects can be removed early on in the wet chip delivery system is desirable as it serves to obviate having heavy objects remain in the delivery system for an extended period as presently occurs whereby such objects can, on occasion, cause damage before they reach the parts separator.

SUMMARY OF THE INVENTION

The invention disclosed and claimed herein serves to obviate the above-referenced problems associated with various conventional wet chip processing systems and achieve the sought after desires for a wet chip centrifugal separator processing system. "Chips" as used herein refers to metal, plastic, or other scrap materials generated in a machining or other operation. During the course of the machining operation, the scrap material becomes covered with a lubricating and/or cooling fluid thereby forming what is referred to in the art as "wet chips." When the wet chips are centrifuged, the fluid substantially separates from the scrap material forming what is referred to in the art as "dry chips."

With the present invention, wet chips are pneumatically transported to the centrifugal separator with the wet chips entrained in the air or fluid traveling at entrainment velocity in the wet chip conduit. Accordingly, the need for auger and other type of mechanical conveyors is dispelled, including separate conveyor energy source(s), presently used. In the preferred embodiment, the centrifugal separator serves to generate the requisite energy for both the fluid flow, e.g., air or fluid, required to (i) pneumatically transport wet chips to the centrifugal separator, and (ii) pneumatically expel dry chips from the separator to a recovery site with (iii) the intermediate process of drying wet chips in the centrifugal separator. A separate source of energy heretofore previously used to deliver wet chips generally will not be required.

Briefly, the present invention utilizes a centrifugal separator which preferably has a conduit attached to the inlet manifold of the separator. The conduit, which can be flexible or stationary, as the term is used herein, is an open member which will allow the passage of wet chips. Preferably, it has two ends with an opening at each end. The conduit is positioned adjacent or contiguous to the source of origin of wet chips to be separated.

With the present invention, wet chips are pneumatically transported through the conduit to one or more centrifugal separator(s) where they are centrifuged. The resulting dry chips are pneumatically blown to one or more collection sites while the recovered fluid generally either is recirculated into the system or conveyed to a fluid collection site. The wet chip transport conduit preferably is relatively small in size, illustratively, 4–12 inch tube, compared to the size of conventional mechanical conveyor systems presently employed. Moreover, it is expected that the pneumatic tube or conduit can be relatively easily located in a facility whereby it takes up less space than conventional chip processing systems employing mechanical conveyors.

Further, in the preferred embodiment, actuation of the centrifugal separator serves to generate the pneumatic fluid flow necessary both for pneumatically delivering wet chips to the separator and pneumatically transporting dried chips from the centrifuge following a fluid separation from the wet chips in a centrifuge operation.

If desired, a parts separator can be located at the outboard end of the pneumatic conduit away from the centrifugal separator such that unwanted heavy parts can be removed from the wet chips early on in the wet chip delivery system as opposed to what normally occurs where unwanted, heavy objects are interspersed and travel with the wet chips along the mechanical conveyor system until their removal immediately prior to wet chip entry into the centrifugal separator.

Finally, the pneumatic wet chip conduit can utilize small, hand-held, flexible pneumatic conduits which can be held relatively easily by an operator or maintenance person whereby wet chips, which might fall on the floor at the machine site, can be relatively easily vacuumed into the main pneumatic wet chip conduit.

These and other features, advantages, and objects of the present invention will be further understood and appreciated by those skilled in the art by reference to the following specification, drawings, and claims.

DETAILED DESCRIPTION

Figure 1:
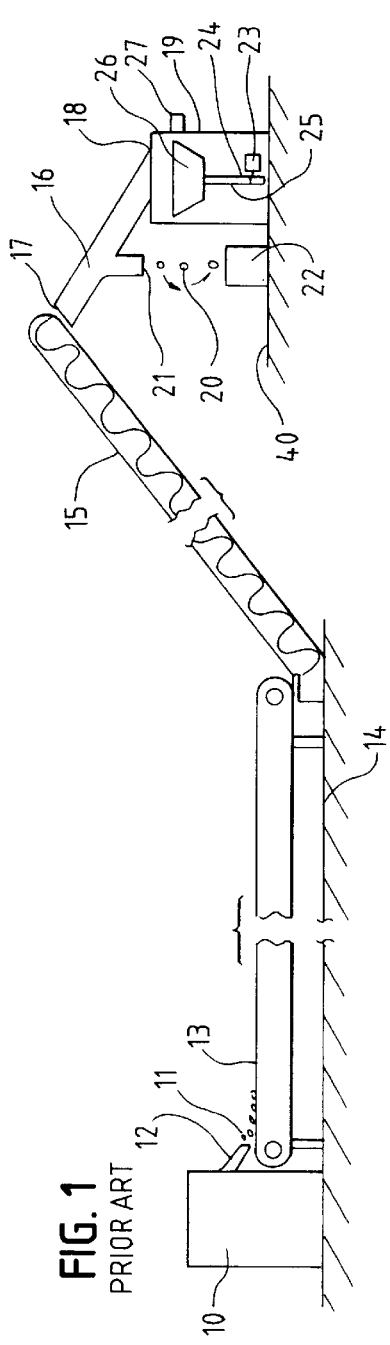
FIG. 1 shows a schematic elevation view of an illustrative prior art system for transporting and separating wet chips utilizing a conventional mechanical conveyor system.

Referring to the drawings, FIG. 1 illustrates a wet chip separator system available today. Briefly, wet chips to be separated are generated as a scrap byproduct at a tooling or other machine station 10. For example, in the course of a lathe, milling, router, or other machining operation where one or more tools act on a work piece, the work piece is lubricated and/or cooled by a fluid in the machining operation. Scrap material 11 generated in the course of a machining operation, is illustrated passing from machine station 10 at exit port 12. The scrap generally comprises elongated helical pieces made of metal such as cast iron, aluminum, brass, or plastic. The scrap is generally referred to as "wet chips" in that lubricating fluids coat the individual chips. Wet chips are relatively heavy. Illustratively, ten pounds of wet metal chips can comprise from one to two and one-half pounds of lubricating coolant or fluid. Wet chips, in some instances, are conveyed 10–15 feet or more along a mechanical conveyor. In some applications, the mechanical conveyor system raises vertically along the length of wet chip travel. As wet chips 11 exit machine station 10 at exit port 12, they pass onto mechanical conveyor 13 which is illustrated being substantially parallel to floor 14. The wet chips are transported on a belt type or auger type conveyor well known in the art. As illustrated in FIG. 1, wet chips 11 fall from conveyor 13 onto inclined auger conveyor 15 which conveys wet chips 11 vertically upward at a suitable angle. Separate sources of energy, e.g., motors, are required to actuate the conveyors 13 and 15.

The wet chips then drop into a parts separator device 16 of the type such as shown and disclosed in Nemedi U.S. Pat. No. 5,106,487. The wet chips fall by gravity along the length of separator conduit 16 which has two ends. Outboard end 17 is open and adapted to receive wet chips to be separated, whereas remaining end 18, which also is open, is illustrated attached to centrifugal separator or chip wringer 19, such as shown and disclosed in the above-referenced Nemedi U.S. Pat. No. 5,264,124.

As wet chips pass over opening 20 in the bottom wall of separator 16, undesired, heavy objects 20 such as bolts, nuts, etc. drop through parts separator opening 21 into bin 22 whereas the wet chips to be separated pass through separator end opening 18 into a centrifugal separator 19. Centrifugal separator 19 employs a motor 23 connected by suitable pulleys 24 to one end of shaft 25. The opposite end of vertical shaft 25 is connected to a rotatable bowl 26 having a plurality of spaced blades, not shown, disposed in bowl 26. When motor 23 is actuated, both bowl 26 and the spaced blades rotate such that wet chips received in the bowl travel upward along the length of the inner bowl wall. As the wet chips are centrifuged, they reach the top of bowl 26, whereupon they pass over a screen, not shown, mounted to a bowl flange. Fluid separates from the solid chips and passes through the screen openings whereas the dry chips continue to pass over the screen to separator exit port 27 where they are blown out of separator 19 to a collection site such as a scrap bin or the like. The separated lubricating fluid either is recirculated to a tooling machine station for reuse as a tool and work piece lubricant/coolant or it is captured in a suitable fluid collection site.

The invention disclosed and claimed herein contemplates the replacement of the conventional mechanical type conveyor system of FIG. 1 with a pneumatic wet chip conduit system. Preferably, the source of energy required for delivering wet chips to the separator, delivering dry chips to a recovery site with the intermediate process of chip separation is the centrifugal separator motor and associated rotatable separator bowl used with centrifugal separators presently available in the market.

Figure 2:
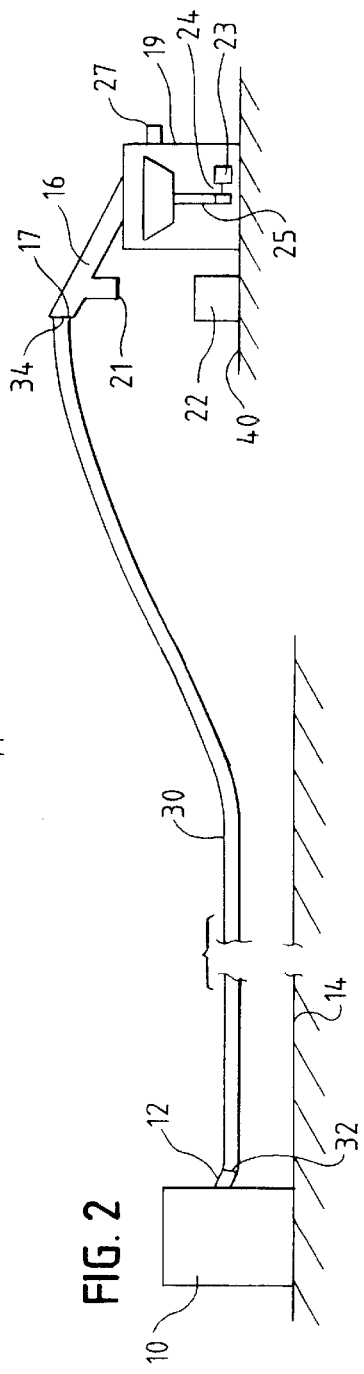
FIG. 2 shows a schematic elevation view of a wet chip delivery and separation system of the present invention.

Specifically, referring to FIG. 2, conduit 30 replaces mechanical conveyors 13 and 15. Conduit 30 can be fabricated from sheet metal to form a conduit of any desired size or shape. If desired, the conduit could be flexible, plain or corrugated plastic tubing having a smooth, ribbed or roughened inner wall surface. The tubing can be approximately 4–12 inches in diameter or fabricated to form, for example, a 5"×5" square conduit opening. If desired, the conduit could be made by other suitable materials sufficient to permit wet chips to be transported from a source of origin to a centrifugal separator. Conduit 30 also could be of varying dimensions along its length, as, for example, as the conduit approaches centrifugal separator 19, the size of the conduit could increase, for example, from a 4-inch opening to a 6-inch opening. It can be suspended from the ceiling of a building or deposited in a trough in a building floor, or, if desired, the conduit can simply be positioned above ground level 14. The conduit also can be of any desired length; and, if desired, it can be inclined, as required in installation, to pass to a second ground floor 40 as illustrated in FIG. 2.

FIG. 2 illustrates conduit 30 having a first wet chip conduit end or port 32 removably connected to scrap discharge chute 12 attached to tooling machine 10. The opposite end or port 34 of conduit 30 is removably attached to parts separator 16.

Upon actuation of centrifugal separator 19, air or other suitable fluid is drawn in through parts separator discharge exit 21 and conduit 30 to produce a vacuum or negative pressure in conduit 30 relative to the ambient atmospheric pressure sufficient to cause wet chips to pass via pneumatic air flow from conduit end 32 through wet chip conduit 30 into centrifugal separator 19 where the wet chips are centrifuged and separated into dry chips and fluid. Actuation of centrifugal separator 19 causes rotation of the rotatable bowl and blades sufficient to generate the necessary pneumatic flow of fluid in conduit 30 to pneumatically deliver wet chips to the separator while at the same time serving to supply sufficient air pressure to pneumatically blow dry chips from separator 19 following wet chip separation in the centrifugal separator 19.

Figure 3:
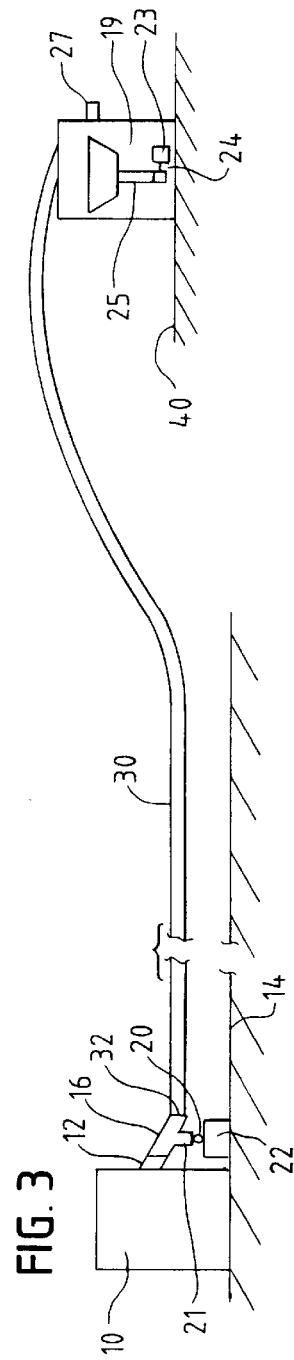
FIG. 3 shows a schematic elevation view of a second embodiment of the wet chip separator system of the present invention in which a parts separator has been positioned at the outboard end of the pneumatic wet chip delivery conduit.

Further, whereas conventional wet chip separation systems position parts separator 16 to be attached or contiguous to centrifuge separator 19, as illustrated in the embodiment of FIG. 3, parts separator 16 could be located at the outboard end 32 of conduit 30. In this particular embodiment, wet chips having unwanted, heavy objects pass from chute 12 through parts separator 16 where unwanted parts 20 exit through separator opening 21 into collection bin 22. The air or fluid required for actuation of parts separator 16 is generated by centrifugal separator 19 which pulls a vacuum or negative pressure through conduit 30 and a portion of parts separator 16.

Figure 4:
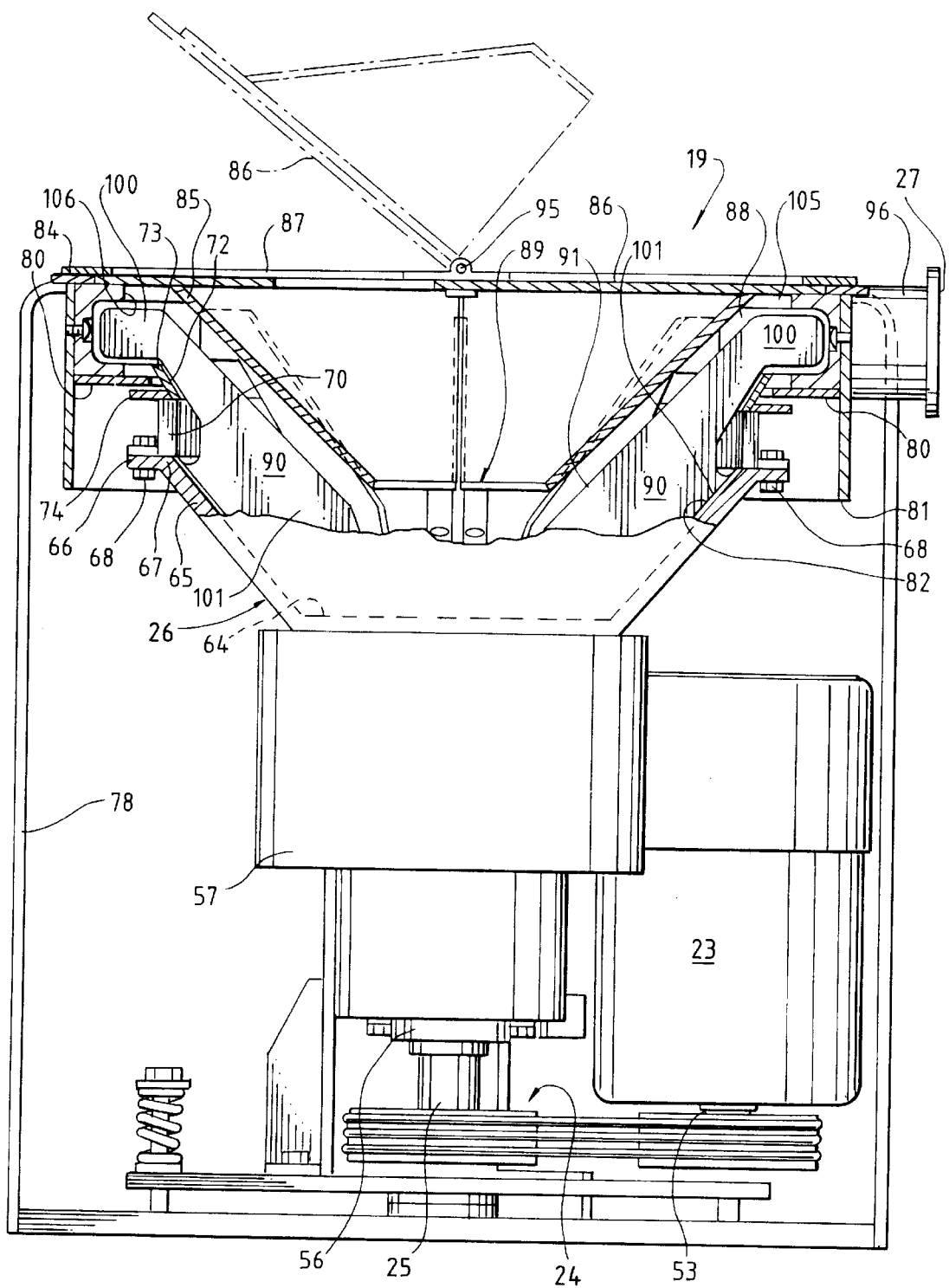
FIG. 4 shows an elevation section view of a centrifugal separator employed in the wet chip processing system of the present invention.

The details of centrifugal separator 19 are shown in FIG. 4. Specifically, centrifugal separator device 19 includes motor 23 which has a drive shaft 53 connected by belt and pulley drive assembly 54 to one end of centrifugal separator drive shaft 25. Shaft 25 is disposed within bearing assembly 56.

The remaining end of drive shaft 25 is secured to a substantially cone or bell-shaped separator bowl 26. Upon actuation of motor 23, bowl 26 connected to shaft 25 through assembly 24, rotates. Cylindrical housing 57 encloses the lower end of the bowl 26 and shaft 25.

Bottom wall 64 of separator bowl 26, which has inner and outer wall surfaces, extends outwardly and terminates in bowl wall 65. Wall 65 extends vertically upwardly and outwardly with a mounting flange 66 located at upper end 67 of bowl wall 65. A substantially cylindrical separator screen 70, which is defined by a wire mesh or the plurality of spaced, elongated bars forming narrow openings, or the like, extends upwardly from flange 66. Screen 70 permits discharge of lubricating liquid separated from the metal chips in the centrifuged separator bowl, the lubricant passing through the mesh or other openings in screen 70 while the metal chips are centrifuged upwardly past screen 70. Liquid discharged through the openings in screen 70 will be collected in a suitable collection chamber, not shown, preferably disposed within casing chamber 78 in which the parts of the centrifugal separator device are disposed. Screen 70 is secured to flange 66 by means of a plurality of suitable fasteners 78.

Conical portion 72 is secured to the upper edge of screen 70 and extends radially outward in an upward direction to dispensing edge 73. A radially extending flange 74 is secured to the centrifugal separator bowl 60 intermediate the juncture between conical portion 72 and screen 70. A radially inwardly directed flange 80 is secured to cylindrical outer wall support member 81 which depends from and is attached to the top of chamber 78 as seen in FIG. 1.

Cover 84 is fixed in any desired manner to the upper edge of chamber 78. In the particular embodiment of FIG. 4, cover 84 includes an upper conical member 85 which is fixedly attached to and depends from cover 84. Conical member 85 comprises two pivotable cone-shaped portions 86, 87 whereby the outer wall of conical member 85 defines the inner wall of annular chip collecting chamber 88 and the cylindrical support wall member 82 defines the outer wall thereof.

Cone 85 converges in a downward direction to a location spaced immediately above and within separator bowl 26. Opening 89 at the bowl lower end of conical member 85 defines an air inlet as well as a material inlet for a mix of lubricant plus chips, shavings or the like into centrifuge separator device 19. Spaced blade assemblies 90 are securely fastened to and rotate with rotatable separator bowl 26.

In a typical operation, metal chips and lubricating fluids to be separated are delivered to the top of centrifuge 19 from a discharge end of a parts separator chute, not shown, which is well known in the prior art. The mixed chips and fluids enter centrifuge 19 and pass through opening 89 at the bottom of conical member 85. The fluid mixed with the metal or plastic chips passes into rotating separator bowl 26 where the materials to be separated are centrifuged outwardly and travel upwardly along both the internal surface of bowl wall 65 and the leading surfaces of the rotating blades in blade assemblies 90. The lubricating fluid separates from the chips and passes through screen 70 to a collection chamber (not shown) where the lubricating fluid is collected. The rotating blades also serve to draw or pull fluid such as air downwardly through opening 89 in cone 85. The air then passes upwardly through the space between the outside surface of cone 85 and bowl 60. Following separation from the lubricating fluid, metal chips, shavings and the like, continue to be directed upward by the centrifugal action of the separating device past screen 70 and dispensing edge 73 where the separated chips and shavings are directed out of discharge chamber 88, exit chute 96 and exit port 27 to a collecting site.

Separator bowl 26 is shown with a plurality of spaced blade assemblies 90 (generally six or eight) disposed within, the blades preferably being releasably fixed to the bowl. The blade assemblies are shown in greater detail in Nemedi U.S. Pat. No. 4,936,822, the entire disclosure and drawings of which are incorporated herein by reference. Each blade assembly 90 includes a pad 101, which is secured to the bowl 26 and extends at right angles to blade 91. Blade 101 projects upward beyond the location of screen 70 into chamber 88 of discharge housing 105 as shown in FIG. 4. Each blade 91 includes a radially extending paddle 100 at its upper end, which is disposed within the scroll housing.

The air movement within the scroll or discharge chamber 88 plus blade paddles 100 serve to direct or otherwise move the chips through the annular-shaped portion of discharge chamber 88 and exit chute 96. As best shown in FIG. 4, discharge chamber 88 comprises annular-shaped support walls 80, 81 which support a plurality of annular or scroll segments 107. As each blade 91 and its respective paddle 100 rotates in a clockwise direction, air and metal chips are swept, blown or pulled past scroll segments 107 and out discharge outlet 96. Centrifugal separators which are available for use in the present disclosed and claimed system are available, for example, from Inter-Source Recovery Systems, Inc., 1470 South 8th Street, Kalamazoo, Mich. 49009-9396, wringer model sizes 20", 30", 40", and 50."

Figure 5:
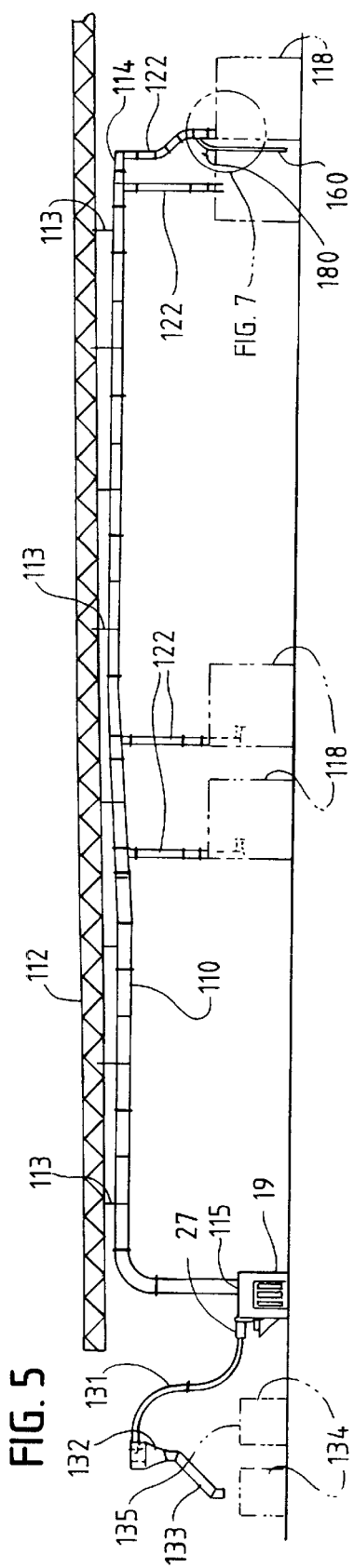
FIG. 5 shows a schematic elevation view of a wet chip separation system of the present invention with a pneumatic wet chip conduit connected to a plurality of wet chip collection stations and a centrifugal separator or chip wringer.
Figure 6:
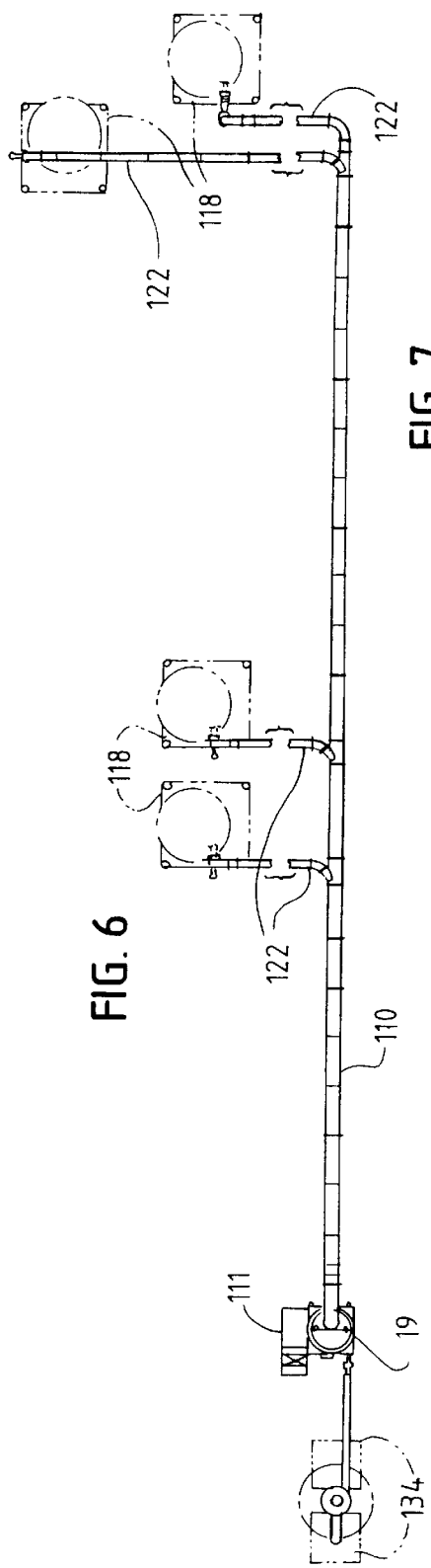
FIG. 6 shows a plan view of the wet chip separation system of FIG. 5.

FIGS. 5 and 6 show a further embodiment of the present invention in which wet chip conduit 110 is illustrated, in FIG. 5, suspended from a building ceiling 112 by straps 113. Conduit 110 has a first outboard end 114 and a second end 115, the latter being connected to the inlet port or manifold of centrifugal separator 19. A plurality of machine tool stations 118 are spaced away from separator 19 and below wet chip conduit 110. Conduit 110 is illustrated as being tapered in size with the largest diameter of the conduit located at the location of conduit end 115, which attaches to the centrifugal separator 19, whereas the smaller diameter conduit opening is located at outboard conduit end 114. A plurality of auxiliary wet chip conduits 122 are connected to and depend from conduit 110. A wet chip discharge chute outlet, not shown, attached to each tool machine 118 is connected to the outboard end of an auxiliary conduit 122 with the remaining auxiliary conduit end being connected or otherwise joined to conduit 110 whereby wet chips in each machine 118 are pneumatically conveyed through conduits 110 and 122 upon actuation of centrifugal separator or chip wringer 19. In the wringer, the wet chips are centrifuged and separated into lubricating fluid/coolant and dry chips. The dry chips are pneumatically blown from separator discharge chute 27 through flexible conduit 131 to cyclone 132 where they drop through swivel chute 133 into collection bins 134, 135. The source of energy for pneumatically blowing the dried chips is the motor used to rotate the separator bowl and blades. In other applications, rather than blow the dried chips to a cyclone, the chips are blown to a dry chip recovery tank without need of a cyclone. The recovered lubricant/fluid is collected in tank 111 illustrated in FIG. 6.

Figure 7:
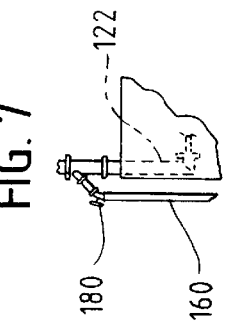
FIG. 7 shows an enlarged fragmentary view along 7—7 in FIG. 5 of a manually-held pneumatic wet chip conduit located at a machine station where wet chips are generated; and, FIG. 8 shows an auxiliary blower attached to the pneumatic wet chip conduit mediate the outboard end of the pneumatic wet chip conduit and the opposite conduit end connected to a parts separator for assisting in creating fluid flow necessary to pneumatically deliver wet chips to the centrifugal separator.

FIGS. 6 and 7 illustrate another conduit 160 connected to and depending from conduit 122. Conduit 160 constitutes a manually-held hose-type conduit which preferably can be made of a flexible, plastic or metal material. Hose 160 can be optionally positioned at a desired location such as a tooling machine site. Should wet chips inadvertently fail to be transported from a machine through conduits 122 and 110, but instead fall to the floor, an operator or maintenance personnel need not sweep up the wet chips, but rather, a valve 180 can be opened and hand-held conduit 160 can be moved manually by an operator about the machine and contiguous area whereupon the wet chips lying on the floor can be pulled by vacuum into conduits 160, 122, and 110.

Figure 8:
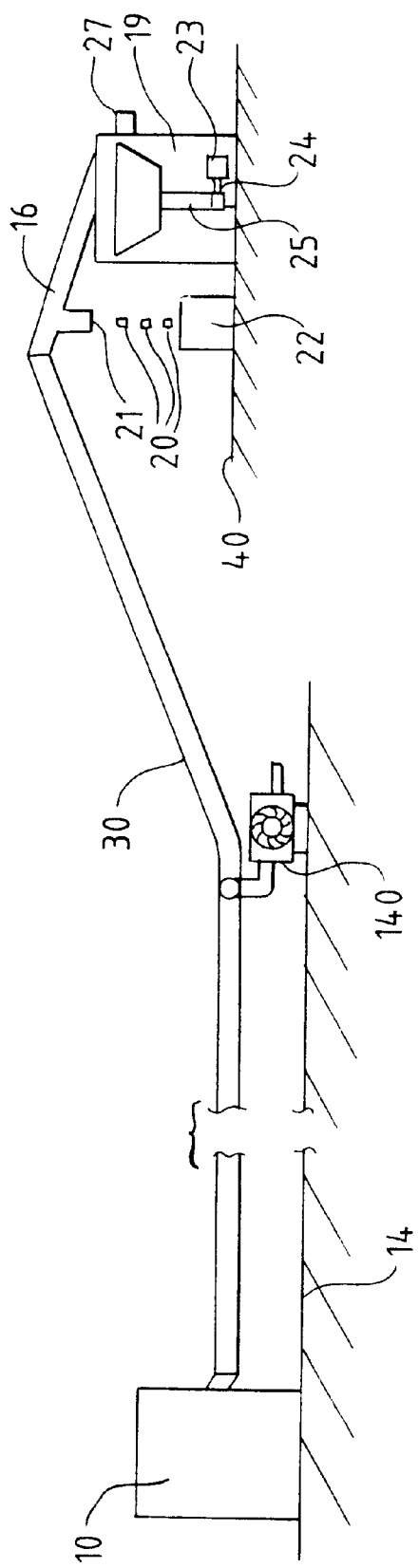

FIG. 8 shows another embodiment of the chip processing system of the present invention. In this particular embodiment, blower 140 has been attached to conduit 30 to assist in generating the pneumatic flow of air or other fluid through conduit 30. Blower 140 can be sized either to supply all the required fluid through conduit 30 sufficient to pneumatically transport wet chips from station 10 to separator 19 or it can be employed in conjunction with separator 19 to provide the desired pneumatic air or fluid flow through conduit 30 sufficient to transport wet chips from machine 10 to centrifugal separator 19 and deliver dried chips to a desired recovery site. If desired, blower 140 could be located at the dry chip outlet side of centrifugal separator 19 to serve to generate the desired pneumatic fluid flow.

If desired, one or more blowers 140 could be utilized whereby ambient air could be supplied to or removed from conduit 30 sufficient to pneumatically transport the wet chips to the separator.

It is envisioned that in most instances, actuation of the centrifugal separator(s) in a system will be sufficient to generate both an adequate vacuum or negative pressure in conduit 30 to transport wet chips while simultaneously centrifuging the chips thereby drying them and blowing the dry chips out of the separator under positive pressure. While, normally, it is contemplated that a negative pressure for the wet chip fluid flow will occur; if desired, the pneumatic air or fluid flow could be oriented to have a positive air or fluid pressure in the wet chip conduit sufficient to permit the requisite pneumatic flow of wet chips to the centrifugal separator.

It is also envisioned that while FIGS. 2 and 3 illustrate a parts separator 16 at either end of the wet chip conduit 30, it is appreciated that a parts separator could be located mediate the wet chip conduit ends.

Experiments were conducted to ascertain whether the desired pneumatic flow could be delivered with a centrifugal separator employed for separating wet chips. It is postulated that in a separation application where wet chips would be conveyed substantially horizontally a distance of approximately 25 feet, ambient air must travel at an entrainment velocity of approximately 5,000 feet per minute in the wet chip conduit.

Accordingly, a flexible plastic, corrugated tubing was connected to the inlet side of an Inter-Source centrifugal separator having a 40-inch diameter bowl. The conduit was approximately 25 feet (25') in length and varying diameter tubes were employed. The conduit had two ends, one end being connected to the inlet side of the centrifugal separator such that no air in the conduit escaped to the atmosphere while the opposite outboard end remained open to receive ambient air. No parts separator was employed in the experiments.

Upon actuation of the centrifugal separator, air velocity at the outboard end of the wet chip conduit was measured. Additionally, the air velocity at the dry chip discharge end or outlet of the centrifuge was measured. Various tests were conducted.

| | |
|---|---|
| No. 1 | 4-inch diameter, flexible conduit having relatively smooth surface on inside of conduit |
| Air Inlet Velocity | 8,002 ft./min. (vacuum) |
| Air Exit Velocity | 10,945 ft./min. (positive air pressure) |
| Centrifugal Separator Motor Amperage | 26 |
| No. 2 | 6 inch diameter flexible conduit having a corrugated, roughened inside surface whereby inside conduit surface was less smooth than in No. 1 test |
| Air Inlet Velocity | 7,591 ft./min. |
| Air Exit Velocity | 11,598 ft./min. |
| Centrifugal Separator Motor Amperage | 26 |
| No. 3 | 8 inch diameter flexible conduit having a relatively smooth inside surface |

-continued

| | |
|---|---|
| Air Inlet Velocity | 9,882 ft./min. |
| Air Exit Velocity | 13,012 ft./min. |
| Centrifugal Separator Motor Amperage | 26 |

Viewing the results, it is believed that the utilization of a conduit having a corrugated inner surface in Test No. 2 as opposed to the relatively smooth inner surfaces for the conduits employed in Tests No. 1 and No. 3 caused the air inlet velocity to decrease.

Based upon the results of these tests, it also is expected that the desired entrainment velocity for wet pneumatic chip transport can be achieved whereby wet chips can be pneumatically delivered to the centrifugal separator. The centrifugal separator will serve to provide the appropriate source of pneumatic fluid flow for both the wet chip pneumatic delivery and the dry chip pneumatic discharge. Actuation of the centrifuge causes the rotatable bowl to rotate which, in turn, causes creation of the appropriate entrainment velocity and air or fluid volume in the pneumatic wet chip conduit and dry chip exit system.

While the present invention has been described with reference to the specific examples, which are intended to be illustrative only and not to be limiting of the invention, it will be apparent to those of ordinary skill in the art that changes, additions, and/or deletions may be made to the disclosed embodiment without departing from the spirit and scope of the invention.

What is claimed is:

1. The method of separating wet chips into dry chips and fluids according to the steps of:
   pneumatically conveying wet chips to be separated from a source of wet chip origin to at least one centrifugal separator; and
   centrifuging the pneumatically delivered wet chips in the separator whereby the wet chips are separated into dry chips and fluid.

2. The method of wet chip separation in accordance with claim 1 and further including the steps of:
   delivering the dry chips to a first collection site; and,
   delivering the fluid to a second collection site.

3. The method of wet chip separation in accordance with claims 1 or 2 and further including conveying the wet chips to be separated through a wet chip conduit.

4. The method of wet chip separation in accordance with claim 3 wherein said conduit is flexible.

5. The method of wet chip separation in accordance with claim 3 and further including the step of passing the wet chips through a parts separator where unwanted objects are separated from the wet chips prior to the wet chips being delivered to said centrifugal separator.

6. The method of wet chip separation in accordance with claim 3 and further including passing the wet chips to be separated through a parts separator where unwanted objects are separated from the wet chips prior to said wet chips passing through said wet chip conduit.

7. The method of wet chip separation in accordance with claim 3 and further including the step of attaching at least one blower to said wet chip conduit and actuating said blower to assist in pneumatically conveying wet chips to said centrifugal separator.

8. The method of wet chip separation in accordance with claim 3 and further including the step of utilizing air as the fluid for pneumatically conveying wet chips to the centrifugal separator and pneumatically conveying dry chips out of the separator following separation.

9. The method of wet chip separation in accordance with claim 8 wherein the pneumatic flow sufficient to convey the wet chips and dry chips is generated upon actuation of the centrifugal separator.

10. The method of wet chip separation in accordance with claim 9 and further including the step of actuating at least one blower connected to the wet chip delivery conduit to generate additional fluid to pneumatically convey wet chips to be dried to the centrifugal separator.

11. The method of wet chip separation in accordance with claim 9 and further including the addition of a blower contiguous to the dry chip outlet of the separator and actuating said blower to assist in pneumatically conveying wet chips to be dried into and through the separator and pneumatically conveying dry chips from the separator.

12. The method of wet chip separation in accordance with claim 3 and further including the step of pneumatically conveying the wet chips through the conduit by creating a vacuum in said wet chip conduit and blowing dry chips from said centrifuge under positive pressure relative to ambient pressure.

13. The method of transporting wet chips to a centrifugal separator adapted to centrifuge and separate wet chips into dry chips and fluid according to the steps of:
   providing a conduit having at least first and second conduit ends between a source of wet chip origin and the centrifugal separator;
   providing a fluid source in said conduit whereby wet chips can be pneumatically transported through said conduit;
   passing said wet chips through one of said at least first and second conduit ends; and,
   passing said wet chips from said conduit at another of said at least first and second conduit ends to said centrifugal separator.

14. The method of transporting wet chips in accordance with claim 13 and further including the step of:
   actuating said centrifugal separator to generate said fluid source to pneumatically transport wet chips through said conduit.

15. The method of transporting wet chips in accordance with claims 13 or 13 in which the pneumatic fluid is ambient air.

16. The method of wet chip transportation in accordance with claim 14 and further including the step of centrifuging and separating wet chips in said centrifugal separator.

17. The method of wet chip transportation in accordance with claim 16 and further including the step of simultaneously pneumatically delivering wet chips to said centrifugal separator and centrifuging and separating wet chips into dry chips and fluid.

18. The method of wet chip transportation in accordance with claim 17 and further including the step of diverting dry chips from said centrifugal separator to a first collection site and directing separated fluid to a second site.

19. The method of wet chip transportation in accordance with claim 14 and further including the steps of:
   connecting said conduit to said centrifugal separator; and,
   actuating said centrifugal separator to create a vacuum in said wet chip conduit.

20. The method of wet chip transportation in accordance with claim 14 and further including the step of:
   placing a parts separator at a wet chip conduit end for allowing heavy objects to be removed from the pneumatic flow of wet chips prior to said wet chips entering said separator.

21. The method of wet chip transportation in accordance with claim 14 and further including the step of:
   placing a parts separator at a conduit end for allowing heavy objects to be removed from the wet chips prior to said wet chips entering said wet chip conduit.

22. The method of wet chip transportation in accordance with claim 14 and further including the step of placing a parts separator mediate the ends of the pneumatic wet chip conduit whereby wet chips passing through said conduit pass through said parts separator and heavy objects are removed and the wet chips thereafter pass through said remaining conduit.

23. The method of wet chip transportation in accordance with claim 14 wherein said wet chip conduit is flexible.

24. The method of wet chip separation in accordance with claim 14 and further including:
   connecting a moveable conduit to said wet chip conduit, said moveable conduit having a first end connected to said wet chip conduit and a second end adapted to receive wet chips; and
   moving said moveable conduit to pull wet chips to be separated into said moveable and wet chip conduits.

25. The method of transporting and separating wet chips into dry chips and fluid in a system comprising a wet chip conduit having at least first and second conduit ends; a parts separator comprising a parts separator conduit having at least first and second ends, said parts separator being positioned relative to said second conduit end of said wet chip conduit to allow wet chips to pass from said wet chip conduit into said parts separator; a centrifugal separator comprising a wet chip inlet port, a rotatable bowl and spaced blades disposed in said bowl and adapted to rotate with said bowl, a motor adapted to rotate said bowl, a screen having spaced openings disposed at the top of said bowl, and a dry chip exit port, said parts separator second conduit end being located contiguous to said centrifugal separator wet chip inlet port; and a blower associated with said wet chip conduit for generating pneumatic flow in said wet chip conduit, said method comprising:
   creating a pneumatic fluid flow in said wet chip conduit upon actuation of said blower sufficient to transport wet chips to be separated from said first wet chip conduit end to said second wet chip conduit end, through said parts separator and into said centrifugal separator;
   activating said centrifugal separator to centrifuge said wet chips in said centrifugal separator into dry chips and fluid; and,
   transporting said dry chips to a dry chip collection site.

26. The method of transporting and separating wet chips in accordance with claim 25 wherein said centrifugal separator comprises said blower and serves to provide said sufficient pneumatic flow in said wet chip conduit when said centrifugal separator is activated.

27. The method of transporting and separating wet chips into dry chips and fluid in a system comprising a wet chip conduit having at least first and second conduit ends; a parts separator comprising a parts separator conduit having at least first and second ends, said parts separator being positioned relative to said first conduit end of said wet chip conduit to allow wet chips to pass from said parts separator into said wet chip conduit; a centrifugal separator comprising a wet chip inlet port, a rotatable bowl and spaced blades disposed in said bowl and adapted to rotate with said bowl, a motor adapted to rotate said bowl, a screen having spaced openings disposed at the top of said bowl, and a dry chip exit port, said wet chip second conduit end being located contiguous to said centrifugal separator wet chip inlet port to permit wet chips to enter said centrifugal separator; and a blower associated with said wet chip conduit for generating pneumatic flow in said wet chip conduit, said method comprising:
   creating a pneumatic flow in said wet chip conduit upon actuation of said blower sufficient to transport wet chips to be separated through said part separator, through said wet chip conduit and into said centrifugal separator;
   actuating said centrifugal separator to centrifuge said wet chips in said centrifugal separator into dry chips and fluid; and,
   transporting said dry chips to a dry chip collection site.

28. The method of transporting and separating wet chips in accordance with claim 27 wherein said centrifugal separator comprises said blower and serves to provide said sufficient pneumatic flow in said wet chip conduit when said centrifugal separator is actuated.

29. The method of transporting and separating wet chips into dry chips and fluid in a system comprising a wet chip conduit having at least first and second conduit ends; a centrifugal separator comprising a wet chip inlet port, a rotatable bowl and spaced blades disposed in said bowl and adapted to rotate with said bowl, a motor adapted to rotate said bowl, a screen having spaced openings disposed at the top of said bowl, and a dry chip exit port, said second wet chip conduit end being located contiguous to said wet chip inlet port; and a blower associated with said wet chip conduit for generating pneumatic flow in said wet chip conduit, said system being free of a parts separator and said method comprising:
   creating a pneumatic fluid flow in said wet chip conduit upon actuation of said blower sufficient to transport wet chips to be separated from said first wet chip conduit end to said second wet chip conduit end and into said centrifugal separator;
   actuating said centrifugal separator to centrifuge said wet chips in said centrifugal separator into dry chips and fluid; and,
   transporting said dry chips to a dry chip collection site.

30. The method of transporting and separating wet chips in accordance with claim 29 wherein said centrifugal separator comprises said blower and serves to provide pneumatic flow in said wet chip conduit when said centrifugal separator is activated.

31. The method of transporting and separating wet chips in accordance with claims 25, 27 or 29 and including removing the fluid from said centrifugal separator following wet chip separation into dry chips and fluid.

32. The method of transporting and separating wet chips in accordance with claims 25, 27 or 29 and including:
   connecting the first end of a movable conduit having a first end and a second open end to said wet chip conduit; and,
   moving said movable conduit contiguous to wet chips sufficient to permit wet chips to enter into said movable conduit and pneumatically into said wet chip conduit when pneumatic flow is present in said wet chip and movable conduits.

* * * * *

UNITED STATES PATENT AND TRADEMARK OFFICE
CERTIFICATE OF CORRECTION

PATENT NO. : 6,572,779 B2
DATED : June 3, 2003
INVENTOR(S) : William D. Nemedi et al.

It is certified that error appears in the above-identified patent and that said Letters Patent is hereby corrected as shown below:

Column 10,
Line 39, cancel "13 or 13" and insert -- 13 or 14 --.

Signed and Sealed this

Twenty-fifth Day of November, 2003

JAMES E. ROGAN
*Director of the United States Patent and Trademark Office*